United States Patent [19]

Vancil

[11] 3,788,667
[45] Jan. 29, 1974

[54] VEHICLE SAFETY DEVICE
[75] Inventor: Rayburn D. Vancil, Carterville, Ill.
[73] Assignee: Olin Corporation, New Haven, Conn.
[22] Filed: Dec. 6, 1971
[21] Appl. No.: 205,024

[52] U.S. Cl. .............. 280/150 AB, 137/68, 141/19, 222/5
[51] Int. Cl. ............................................ B60r 21/08
[58] Field of Search.... 280/150 AB; 137/67, 68, 69, 137/70, 71; 222/5

[56] References Cited
UNITED STATES PATENTS

| | | | |
|---|---|---|---|
| 3,663,036 | 5/1972 | Johnson | 222/5 |
| 2,347,204 | 4/1944 | Lindsay | 137/67 |
| 3,690,695 | 9/1972 | Jones, Sr. | 222/5 X |
| 2,804,317 | 8/1957 | Prater | 137/68 |
| 3,172,684 | 3/1965 | Isaac | 280/150 AB |
| 3,242,666 | 3/1966 | Peterson | 280/150 AB |
| 3,637,110 | 1/1972 | Cirillo | 280/150 AB |
| 2,712,881 | 7/1955 | Mathisen | 137/68 |
| 3,642,304 | 2/1972 | Johnson | 222/5 |

Primary Examiner—David Schonberg
Assistant Examiner—John P. Silverstrim
Attorney, Agent, or Firm—H. Samuel Kieser

[57] ABSTRACT

An apparatus for use in a vehicle safety system utilizing inflatable confinement means, a stored fluid under pressure, and a propellant charge for the generation of a hot gas. The apparatus includes a elongated reservoir for storing fluid under pressure and is provided with first and second end portions spaced apart in the direction of the axis of elongation. A fluid outlet is provided in the first end portion and has means closing it against fluid flow. A propellant charge storage chamber is provided at the second end portion and has means sealing it from the interior of the reservoir. A rod member extends from a point adjacent the fluid outlet to a point adjacent the means sealing the propellant chamber. The rod member has means for guiding and supporting it at a point adjacent each end. Upon burning of the propellant charge, the means sealing the propellant chamber is opened and the rod member serves to unseal the fluid outlet.

10 Claims, 9 Drawing Figures

PATENTED JAN 29 1974

RAYBURN D. VANCIL
INVENTOR

BY H. Samuel Kiese

ATTORNEY

RAYBURN D. VANCIL
INVENTOR

BY  H. Samuel Kresis
ATTORNEY 3,788,667

VEHICLE SAFETY DEVICE

This invention relates generally to the field of inflatable safety systems, and more particulary to an improved device for inflating the safety bag or confinement of such systems.

Inflatable safety systems of the type using an inflatable bag or confinement to protect the occupant of a vehicle from injury in case of a collision is known in the prior art. One type of system utilizes gas stored under high pressure which is released upon collision to inflate the confinement. This type of system requires the storage of fluid under high pressure in some type of reservoir and the use of a detonator to rupture a portion of the reservoir to release the stored fluid. Such systems tend to be bulky causing problems in fitting them into the limited space available. Leakage in such systems is also a problem due to the relatively high storage pressures required. Obviously, leakage in safety systems of this type cannot be tolerated since the system must be viable for the life cycle of the vehicle which is a substantial period of time.

In order to reduce the size of the container and to reduce the pressure and amount of fluid required to be stored, a system has been developed which uses the gas generated from a propellant to agument the fluid in inflating the confinement. The inflating device of the present invention is of this type and is characterized by being elongated and having an end exhaust so designed as to prevent excessive pressure rise in the fluid reservoir during discharge. Moreover, the device of the present invention is relatively small and has a construction that provides adequate sealing to prevent leakage.

Accordingly, it is an object of the present invention to provide an improved inflating device of the type used in connection with inflatable confinement vehicle safety system.

A more specific object of the present invention is to provide an improved inflating device of the type where the volume of the fluid storage reservoir is less than the volume which would be needed to inflate an inflatable confinement without the addition of heat and gas from the propellant charge.

Another object of the present invention is the provision of a compact inflating device wherein the reservoir for storing fluid under pressure has an elongated configuration and wherein the gas from the propellant and the fluid in the reservoir can properly mix upon actuation and which is sufficiently leakproof to prevent the leakage of the stored fluid.

These and other objects and advantages of the present invention may be accomplished through the provision of means for storing a fluid under pressure which has an axis of elongation in one direction and first and second end portions spaced apart in the direction of said axis. An outlet is provided in said first means at said first end portion and means are provided closing the outlet against fluid flow. Means are connected at the second end portion of said fluid storing means for providing a chamber for storing a propellant charge. Means is provided in alignment with the means closing the outlet for sealing the propellant chamber from the interior of the fluid storage means and is operable upon development of a predetermined chamber pressure to unseal the chamber. Rod means extend from a point adjacent the propellant chamber sealing means to a point adjacent the fluid outlet closing means for disabling the fljid outlet closing means upon the unsealing of the propellant chamber to permit the stored fluid and gas from the burning of the propellant to pass through the outlet. The rod means is supported and guided at a point adjacent each end.

A better understanding of the present invention will be gained by reference to the following description of the preferred embodiments and to the accompanying drawing in which.

Figure 1:
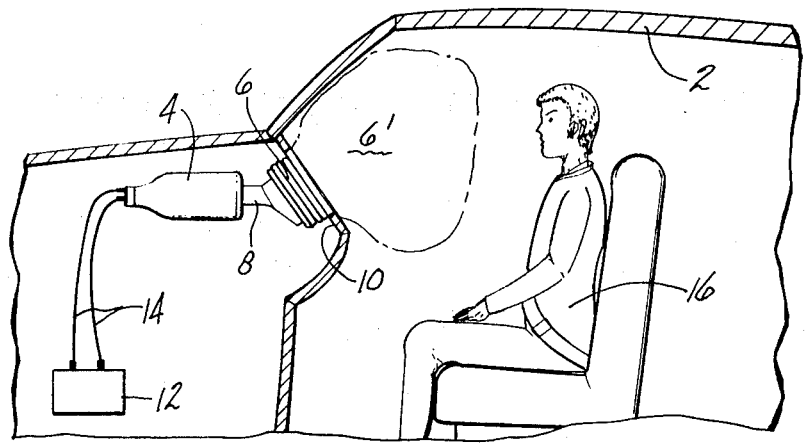
FIG. 1 is a fragmentary side view of a safety system incorporating the present invention, showing one arangement of such system in a vehicle.

Referring to the drawings, and in particular FIG. 1, a system incorporating the present invention is shown mounted in a vehicle 2. The system includes an inflator 4 connected to an inflatable confinement 6 by means of a manifold 8. The confinement 6, in the example shown, is mounted in the dashboard 10 of the vehicle in its deflated or collapsed storage position. The confinement 6 may be in the form of a flexible bag of rubber, cloth, or the like, and may be vented in any known manner, or non-vented if desired.

A collision sensor 12 is attached to the vehicle 2 and its attached to the inflator 4 by suitable electrical connectors 14. The sensor 12 may be of any suitable type which will produce an electrical current when the vehicle is involved in a collision of a predetermined magnitude. The electrical current serves to actuate the inflator 4 which in turn inflates the confinement into its expanded condition as indicated at 6' to provide a soft cushion against which the occupant 16 of the vehicle 2 will impact.

Figure 2:
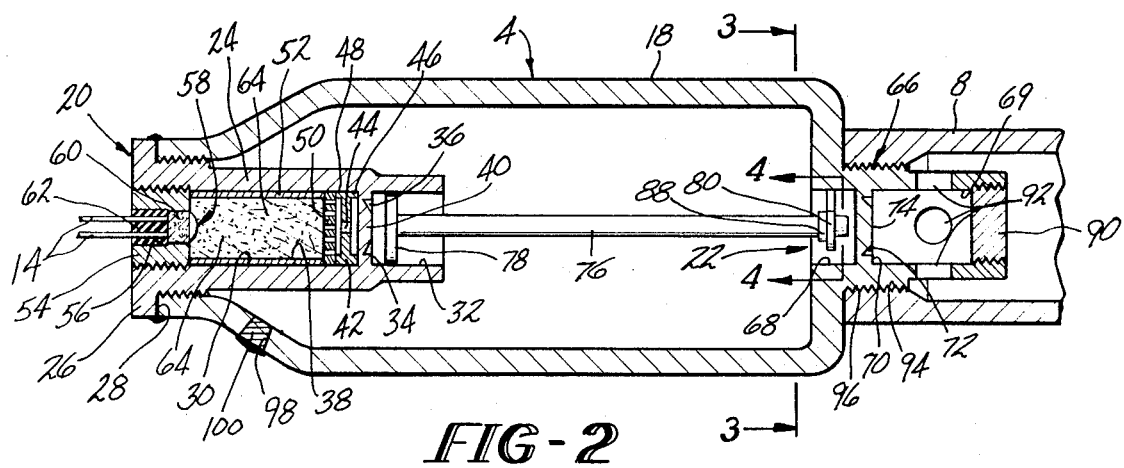
FIG. 2 is a sectional elevational view of one embodiment of the inflating unit of the system of FIG. 1.
Figure 3:
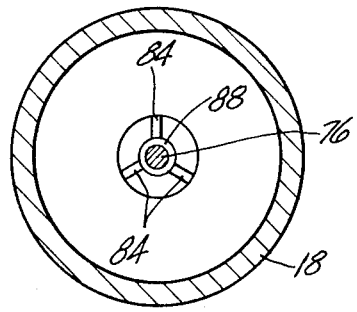
FIG. 3 is a transverse sectional view taken along the lines 3—3 of FIG. 2.
Figure 4:
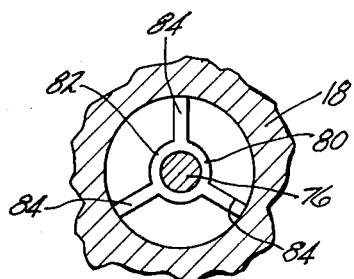
FIG. 4 is an enlarged transverse sectional view taken along the lines 4—4 of FIG. 2.

The inflator 4 of the embodiment shown in FIGS. 2–4 comprises a fluid storage reservoir 18 in the shape of an elongated bottle fabricated from a high strength material such as steel, aluminum or the like. The forward, or left-hand end as viewed in FIG. 2, is reduced to provide the bottle-like shape and is closed by a propellant storage means 20. The rearward end is closed by an integral portion of the reservoir which forms an outlet portion 22. Thus the propellant storage means 22 and the outlet portion 22 are spaced apart along the axis of elongation of the reservoir 18.

The propellant storage means 20 includes a housing 24 which is threadedly attached to the reservoir 18 and extends thereinto with a forward flange 26 covering the forward end of the reservoir 18. The junction 28 between the flange 26 and the end of the reservoir 18 may be welded to provide a leakproof seam. The housing 24 has a bore 30 extending inwardly from its forward end and a bore 32 extending inwardly from its rearward end with the ends of each bore 30 and 32 being spaced from each other to provide a web 34. The web 34 is provided with a circular groove 36 to provide a rupturable closure portion 40 which will rupture at a predetermined pressure to provide communication between the propellant chamber 38 and the interior of the reservoir 18.

A nozzle member 42 having a suitable orifice 44 is positioned within the bore 30 with a rearward flange 46 engaging the web 34 and a forward flange 48 engaged by a perforated screen 50. A sleeve 52 extends from the screen 50 to a plug member 54 threadedly received in the open end of the bore 30. The sleeve member 52 serves to retain the nozzle member 42 and screen 48 in their proper positions.

The plug member 54 includes a bore 56 in which a squib 58 or other suitable ignitor for a propellant charge may be located. The squib 58 may include an explosive charge 60 to which is attached suitable electrical connectors 14. The bore of the plug member 54 may be sealed by conventional plastic 62 or other suitable material.

Prior to the plug member 54 being attached to the housing 24 a suitable propellant charge 64 is positioned within the propellant chamber 38 forward of the screen 50. The propellant may be of any suitable type capable of generating a hot non-toxic gas when ignited and/or mixed with the fluid in the reservoir. The propellant may be in the form of loose powder, a solid gas-generating cartridge, or a plurality of large grains or pellets.

The outlet portion 22 of the reservoir 18 includes a rearward extension portion 66 formed integrally with the remainder of the reservoir 18. A recess or bore 68 extends rearward in the extension portion 66 with its open end communicating with the interior of the reservoir 18 and is separated from a bore 69 in the rearward end of the extension portion by a web 70. The web 70 is provided with a circular groove 72 which provides a rupturable closure portion 74 closing the interior of the reservoir 18 from the manifold 8 and bag or inflatable confinement 6. It is to be noted that bores 68 and 69 in the outlet portion 22 have a common axis which is common with the common axis of bores 30 and 32 in the propellant storage member 20 which in turn is common with the axis of elongation of the fluid storage reservoir 18. Thus, the rupturable closure portion 40 is in axial alignment with the rupturable closure portion 74 in the direction of the axis of elongation of the reservoir 18.

A rod member 76 extends between the bore 32 and the bore 68 with the rod member being supported in each of the bores 32 and 68 at a point adjacent each end. The means for supporting the rod in the bore 32 comprises an enlarged head 78 which has a diameter substantially equal to the diameter of the bore 32 and which is formed integral with the rod. As an alternative, the head 78 may be a separate member and secured to the rod member 76 by threads, welding, or other suitable means.

The support means for the rod member 76 in the bore 68 includes a spider 80 frictionally retained on the rod member 76. The spider 80 includes a circular body portion 82 having a plurality of legs 84 projecting radially outwardly from the body 86 into frictional engagement with the wall of the bore 68. In the particular modification shown in FIGS. 2–4, three such legs 84 are provided, circumferentially spaced about the body 86 in an even manner 120° apart. The legs 84 are sufficiently resilient so they engage the wall of the bore 68 with a frictional fit.

It is preferable that the end of the rod member 76 be held in a position wherein it is spaced from the rupturable closure portion 74. For this purpose, the rod member 76 is provided with a shoulder 88 immediately forward of the spider 80 to prevent movement of the rod member 76 relative to the spider 80 in a direction toward the rupturable closure portion 74. This shoulder 88 may be formed by providing a flange integral with the rod member 76 or may comprise a split snap ring mounted in a suitable groove in the rod member 76.

The bore 69 in the outlet portion 22 of the reservoir 18 has its open end closed by a plug 90 threadedly secured thereto. The walls of the bore 68 have a plurality of apertures 92 therein, each aperture having an axis substantially perpendicular to the axis of the bore 69. The apertures 92 serve to diffuse the exiting gases and are so dimensioned so as to prevent the rupturable closure portions 40 and 74 from passing into the manifold 8 and confinement 6. The manifold 8 is connected to the outlet portion 22 by means of an internally threaded portion 94 connected to the threaded portion 96 of the outlet portion 22.

After the rod member 76 and its supporting means are inserted into position within the reservoir 18 and the propellant storage member 22 attached and welded, a fluid may be introduced into the reservoir 18 through an opening 98 under suitable pressure. After the reservoir 18 is filled with fluid to the proper pressure, a plug 100 may be inserted into the opening 98 and welded in place to provide a fluid-tight seal. The fluid may be air, oxygen, nitrogen, mixtures thereof, or other suitable non-toxic materials.

The operation of the inflator of FIGS. 2–4 when installed as part of the system depicted in FIG. 1 is as follows. When the vehicle 2 is involved in a collision of sufficient magnitude, the sensor 12 is activated and sends an electric current through the electrical connectors 14 to the squib 58 which is thus caused to ignite. The ignition of the squib 58 in turn causes the ignition of the propellant charge 64 and causes it to burn.

When the pressure of the propellant gas against the rupturable closure portion 40 exceeds the rupturing pressure, the closure portion 40 breaks loose from the web 34 permitting the propellant gas to flow into the interior of the reservoir 18. At the same time, the ruptured closure portion 40 impacts against the head 78 of the rod member 76 causing the rod member 76 to move toward the right as viewed in FIG. 2 so that the other end impacts against the rupturable closure portion 74 causing it to break loose and unseal the outlet portion 22. The gas generated by the propellant charge and the stored fluid mix and pass through the ruptured outlet 22 into the manifold 8 and then into the confinement 6 causing the inflation thereof.

The screen 50 retains the propellant charge while burning so that it won't block the orifice 44 of the nozzle member 42. The orifice 44 of the nozzle member 42 restricts the propellant gas flow so that proper pressure is maintained in the propellant chamber 38 to insure complete burning of the propellant charge.

The rod member 76 is maintained in alignment between the two rupturable closure portions 40 and 74 by the head 78 of the rod member 76 being guided by the bore 32 and the spider 80 guiding the other end of the rod member 76 in the bore 68. The enlarged head 78 of the rod member 76 also serves as the surface upon which the ruptured closure portion 40 impacts to cause movement of the rod member, which movement is added by the force of the gas also acting on the head 78 which functions as a piston in the bore 32. The rod member 76 is prevented from passing into the manifold by a plug 90 which closes the extension portion 16 and against which it impacts after it has severed the rupturable closure portion 74.

Figure 5:
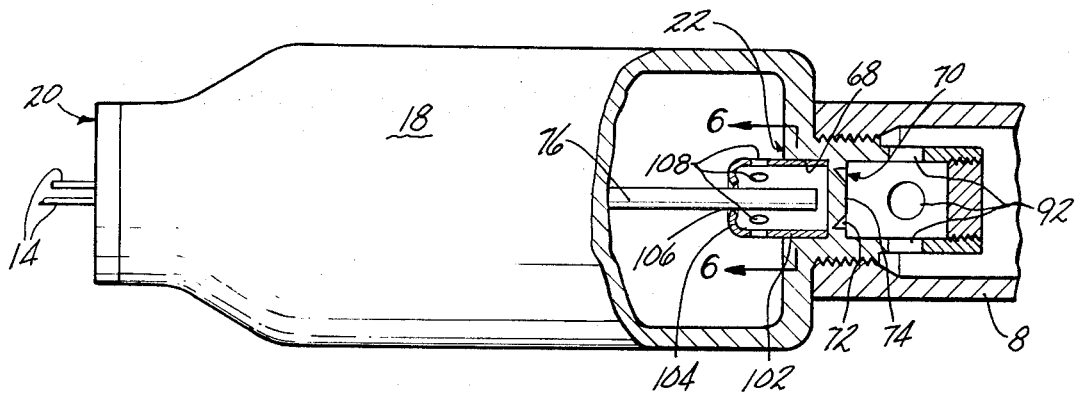
FIG. 5 is a sectional elevational view of an inflating unit similar to that shown in FIG. 2, but showing different rod support means.

An alternative method of supporting and guiding the rearward end of rod member 76 is shown in FIG. 5. As in the previous modification, the rod member 76 extends from the forward end of the reservoir 18 into the bore 68 in the rearward end. A tubular guide sleeve 102 is mounted in the bore 68 in engagement with the side wall thereof. One end of the guide sleeve 102 engages the web 70, and the other end extends into the interior of the reservoir 18. The end of the guide sleeve 102 which extends into the interior of the reservoir 18 is turned inwardly to form an inturned flange 104 having a central aperture 106 therethrough. The rod member 76 extends through the aperture 106 and is guided by the flange 104. The diameter of the aperture 106 should be such that the sleeve member 102 holds the rod member 76 with a friction fit so that its end is held in a position spaced from the rupturable closure portion 74.

Figure 6:
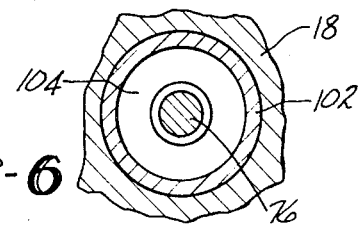
FIG. 6 is an enlarged transverse sectional view taken along the lines 6—6 of FIG. 5.

The sleeve member 102 is provided with a plurality of spaced apertures 108 having axes which extend in a direction perpendicular to the rod member 76. The operation of the device of FIGS. 5 and 6 is identical to that of the previously described embodiment. The inturned flange 104 of the sleeve member 102 serves to deflect the exiting fluids and helps insure that the hot gas and burning of the propellant and the stored fluid properly mix before passing through the apertures 108 and through the ruptured or unsealed outlet portion 22.

Figure 7:
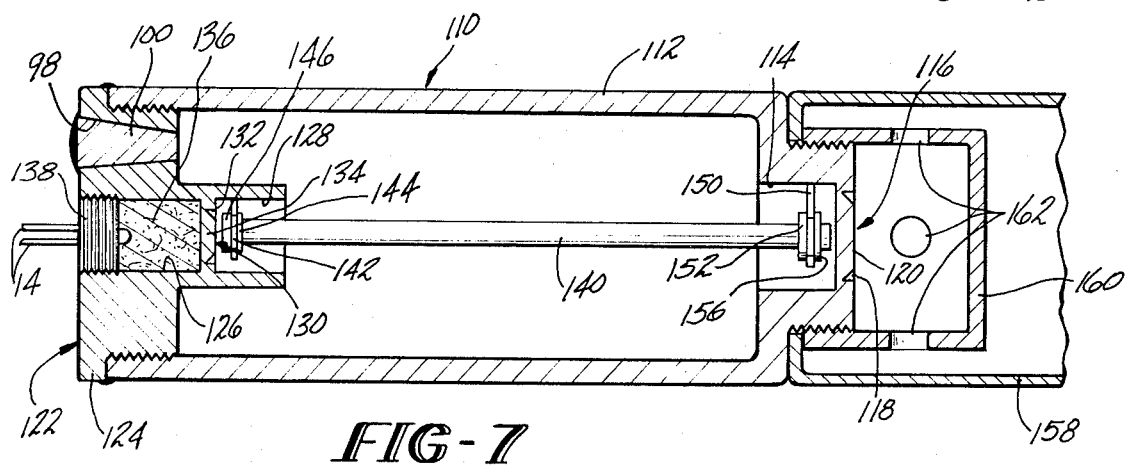
FIG. 7 is a sectional elevational view of a second embodiment of an inflating unit that may be used with the system of FIG. 1.
Figure 8:
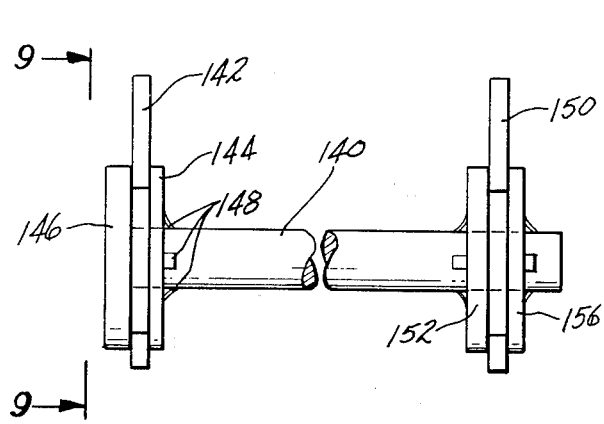
FIG. 8 is an enlarged elevational view of the rod member shown in FIG. 7.
Figure 9:
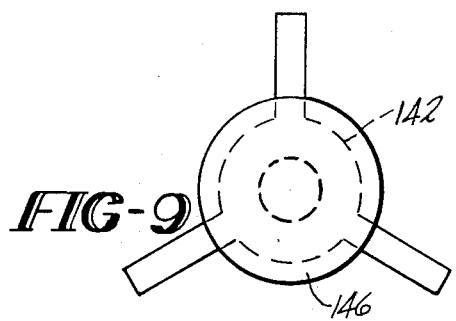
FIG. 9 is an end view taken in the direction indicated by the lines 9—9 of FIG. 8.

A second embodiment of the present invention is shown in FIGS. 7-9. In this embodiment the fluid reservoir 110 is formed from a generally cylindrical housing 112 having a forward open end which is internally threaded. The interior of the reservoir 110 is provided with a bore 114 in its rearward end which forms a web 116 in the end wall. The web 116 is provided with a circular groove 118 which forms a rupturable closure portion 120.

The forward end of the housing 112 is closed by a propellant storage chamber member 122 which is threadedly secured thereto and has a flange 124 engaging the end of the housing 112. The junction between the flange 124 and end of the housing 112 may be welded to provide a fluid-tight seam. The propellant storage chamber member 122 has a bore 126 extending inwardly from its forward end and a bore 128 extending inwardly from its rearward end. The ends of each bore 126 and bore 128 are spaced from each other to provide a web 130. The web 130 is provided with circular groove 132 to provide a rupturable closure portion 134 which will rupture at a predetermined pressure to provide communication between the propellant chamber 136 and the interior of the reservoir 110. A suitable propellant charge such as described above, may be placed in the propellant chamber 136 in the bore 126 and the bore closed by means of threadedly attached squib member 138. It is to be understood that a nozzle member, perforated screen, and a sleeve member may be utilized in the bore 126 as described above in connection with the embodiment of FIGS. 2-4.

A rod member 140 extends from the bore 128 to the bore 114 in the rearward end of a housing 112. The rod member 140 is provided with supporting and guiding means at a point adjacent each of the rupturable closure portions 120 and 134. The forward end of the rod member 140 is supported and guided by means of a three-legged spider member 142. The spider member is held in place by means of a lockwasher 144 holding the spider member 142 against an enlarged head portion 146 at the end of the rod member 140. The lockwasher 144 is provided with a plurality of fingers 148 which frictionally grasp the rod member 140. The other end of the rod member 140 is supported in the bore 114 by means of a spider 150 held on the rod member 140 by means of lockwashers 152 and 156. The legs of each spider member 142 and 150 are resilient and frictionally engage the walls of their respective bores 128 and 114.

With the rod member 140 and its supporting means in place, and the propellant storage chamber member 122 attached to the forward end of the housing 112 and welded thereto, the interior of the reservoir 110 may be filled with a suitable fluid under pressure as previously described.

A manifold 158 is attached to the reservoir 110 and a diffuser member 160 is attached to the outlet end of the reservoir 110 between the rupture closure portion 120 and the manifold 158. The diffuser member 160 is provided with a series of apertures 162 having an axis extending perpendicular of the axis rupturable portion 120.

In operation, when a sensor is activated and sends an electric current to the squib member 138, the ignition of the squib member causes the propellant charge in the propellant chamber 136 to be ignited and burn. When the pressure in the propellant chamber 136 builds up to the predetermined pressure, the rupturable closure portion 134 ruptures and impacts upon the head 126 of the rod member 140. This impaction causes the rod member to move to the left as viewed in FIG. 7 and impact upon the rupturable closure portion 120 causing the rupture thereof. At the same time, the propellant gas exits from the propellant chamber 136 into the interior of the reservoir 110 where it mixed with the stored fluid and exits through the open port created by the rupturing of the rupturable closure portion 120. The apertures in the manifold 158 have a diameter such that they will prevent the rupture closure portion from passing therethrough. The rod member has its movement stopped by the end wall 164 of the diffuser 160.

What is claimed is:

1. An apparatus for use in a vehicle safety system utilizing an inflatable confinement, stored fluid under pressure, and a propellant charge for the generation of hot gas, said apparatus including;
   a. first means for storing fluid under pressure, said first means having a larger dimension in one direction than in a direction perpendicular thereto thereby providing an axis of elongation, and first and second end portions spaced apart in the direction of said axis of elongation;
b. an outlet in said first means at said first end portion;
c. second means closing said outlet against fluid flow;
d. third means including a housing extending into said first means at said second end portion of said first means providing a chamber to receive an ignitible hot gas generating charge of propellant;
e. fourth means in alignment with said second means for sealing said chamber from the interior of said first means and operable upon development of a predetermined chamber pressure after ignition of said propellant charge therein to unseal said chamber;
f. rod means extending from a point adjacent said second means to a point adjacent said fourth means for disabling said second means upon the unsealing of said chamber to permit the stored fluid and hot gas to flow through said outlet; and
g. fifth means adjacent each end of said rod means for supporting said rod means, said fifth means including a bore in said housing coaxial with the axis of elongation of said first means, an internal bore in said first end portion in axial alignment with said bore in said housing, one end of said rod means being supported within said bore in said housing, and means supported by said bore in said first end portion for supporting the other end of said rod means, said means supported by said bore including a tubular member having an internal flange in frictional engagement with said rod means, said tubular member having a plurality of apertures therein having axis perpendicular to said axis of elongation through which the stored fluid and hot gas pass before exiting through said outlet.

2. The apparatus of claim 1 wherein said rod means includes an enlarged head portion slidably received within said bore in said housing.

3. The apparatus of claim 1 wherein said fifth means holds the end of said rod means in a position spaced from said second means.

4. An apparatus for use in a safety system utilizing an inflatable member, a stored fluid under pressure, and a propellant charge for the generation of a hot gas, said apparatus including:
a. a reservoir for storing a fluid under pressure, said reservoir having a larger dimension in one direction than in a direction perpendicular thereto thereby providing an axis of elongation, and having an open end portion and a closed end portion spaced apart along the axis of elongation;
b. a rupturable web portion in said closed end forming a closed outlet;
c. a propellant storage member closing said open end and including a propellant storage chamber therein;
d. rupturable web means sealing said propellant storage chamber from the interior of said reservoir and operable upon development of a predetermined chamber pressure after the ignition of a propellant charge therein to unseal said chamber;
e. rod means extending from a point adjacent said rupturable web means sealing said chamber to a point adjacent said rupturable web portion in said closed end for rupturing said web portion in said closed end upon the unsealing of said propellant chamber to open said outlet to permit the stored fluid and hot gas to exit from said reservoir; and
f. supporting means adjacent each end of said rod means for supporting said rod means, said supporting means including an internal bore in said closed end portion, a bore in said propellant storage member opening to the interior of said reservoir and in axial alignment with said internal bore in said closed end portion, one end of said rod means being supported within said bore in said propellant storage member, and means supported by said bore in said closed end portion for supporting the other end of said rod means, said means for supporting the other end of said rod means including a tubular member having an internal flange frictionally engaging said rod means, said tubular member having a plurality of apertures therein having axes perpendicular to said axis of elongation through which the stored fluid and hot gas pass before exiting through said outlet.

5. The apparatus of claim 4 wherein said means adjacent each end of said rod means supports the rod means in a position wherein it is spaced from said rupturable web portion in said closed end portion so that it impacts upon the rupturable web portion in the closed end upon unsealing of the propellant chamber to open the outlet.

6. The apparatus of claim 4 further including means for limiting the travel of said rod means out of said reservoir after said rod means ruptures said web portion in said closed end portion.

7. The apparatus of claim 4 wherein said rod means includes an enlarged head portion at one end slidably received within said bore in said propellant storage member.

8. An apparatus for use in a safety system utilizing an inflatable member, a stored fluid under pressure, and a propellant charge for the generation of a hot gas, said apparatus including:
a. a reservoir for storing a fluid under pressure, said reservoir having a larger dimension in one direction than in a direction perpendicular thereto thereby providing an axis of elongation, and having an open end portion and a closed end portion spaced apart along the axis of elongation;
b. a rupturable web portion in said closed end forming a closed outlet;
c. a propellant storage member closing said open end and including a propellant storage chamber therein;
d. rupturable web means sealing said propellant storage chamber from the interior of said reservoir and operable upon development of a predetermined chamber pressure after the ignition of a propellant charge therein to unseal said chamber;
e. rod means extending from a point adjacent said rupturable web means sealing said chamber to a point adjacent said rupturable web portion in said closed end for rupturing said web portion in said closed end upon the unsealing of said propellant chamber to open said outlet to permit the stored fluid and hot gas to exit from said reservoir; and
f. supporting means adjacent each end of said rod means for supporting the rod means, said supporting means including a bore in said propellant storage member opening into the interior of said reservoir, an internal bore in said closed end portion in axial alignment with said bore in said propellant storage member, one end of said rod member being supported within said bore in said propellant storage member, and means separate from said rod means and supported in said bore in said closed end portion for supporting the other end of said rod means, the other end of said rod means being spaced from said rupturable web portion in said closed end portion.

9. The apparatus of claim 8 further including means for limiting the travel of said rod means out of said reservoir after said rod means ruptures said web portion in said closed end portion.

10. The apparatus of claim 8 wherein said rod means includes an enlarged head portion at one end slidably received within said bore in said propellant storage member.

* * * * *

UNITED STATES PATENT OFFICE
CERTIFICATE OF CORRECTION

Patent No. 3,788,667            Dated January 29, 1974

Inventor(s) Rayburn D. Vancil

It is certified that error appears in the above-identified patent and that said Letters Patent are hereby corrected as shown below:

In Column 2, line 1, "fljid" should read --fluid--;

In Column 2, line 42, "its" should read --is--;

In Column 6, line 56, after "portion" insert --120--.

Signed and sealed this 29th day of October 1974.

(SEAL)
Attest:

McCOY M. GIBSON JR.            C. MARSHALL DANN
Attesting Officer              Commissioner of Patents